(12) United States Patent
Aleem et al.

(10) Patent No.: US 8,833,815 B2
(45) Date of Patent: Sep. 16, 2014

(54) BUMPER INTEGRATED FORWARD RADAR MOUNTING SYSTEM

(71) Applicant: Ford Global Technologies, LLC, Dearborn, MI (US)

(72) Inventors: Muhammad Azhar Aleem, Canton, MI (US); Brian Fath, Farmington Hills, MI (US); Scott Howard Gaboury, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 13/658,064

(22) Filed: Oct. 23, 2012

(65) Prior Publication Data

US 2014/0111370 A1    Apr. 24, 2014

(51) Int. Cl.
*B60R 19/02* (2006.01)

(52) U.S. Cl.
CPC ..................................... *B60R 19/02* (2013.01)
USPC ............................................ 293/102; 342/70

(58) Field of Classification Search
CPC ...................................................... B60R 19/02
USPC .......................................... 293/102; 342/70
See application file for complete search history.

(56) References Cited

U.S. PATENT DOCUMENTS

| | | | |
|---|---|---|---|
| 6,340,142 B1 | 1/2002 | Li | |
| 6,489,927 B2 * | 12/2002 | LeBlanc et al. | 343/713 |
| 6,496,138 B1 | 12/2002 | Honma | |
| 7,110,324 B2 | 9/2006 | Ho et al. | |
| 7,911,374 B2 * | 3/2011 | Moriuchi et al. | 342/70 |
| 8,014,921 B2 * | 9/2011 | Rao et al. | 701/45 |
| 2001/0024171 A1 * | 9/2001 | Nishimura | 342/70 |
| 2004/0246172 A1 * | 12/2004 | Hirose et al. | 342/198 |
| 2005/0024257 A1 * | 2/2005 | Britton et al. | 342/70 |
| 2006/0012468 A1 * | 1/2006 | Finley et al. | 340/438 |
| 2006/0119473 A1 * | 6/2006 | Gunderson et al. | 340/435 |
| 2009/0140912 A1 * | 6/2009 | Kato et al. | 342/70 |
| 2009/0146865 A1 * | 6/2009 | Watanabe et al. | 342/27 |
| 2010/0097264 A1 | 4/2010 | Kawasaki et al. | |
| 2012/0212364 A1 * | 8/2012 | Takeuchi | 342/70 |

* cited by examiner

*Primary Examiner* — Lori Lyjak
(74) *Attorney, Agent, or Firm* — Shook Hardy & Bacon, LLP

(57) ABSTRACT

A bumper integrated forward radar mounting system for use with a vehicle is disclosed. The system includes a radar module, a bumper attachment bracket and a bumper extension. The radar module is attached to the bumper attachment bracket. The radar module may comprise one or both of a medium range radar component and a long range radar component. The bumper attachment bracket may be composed of a metal or of a polymerized material selected from one of several plastics, fiberglass or nylon. The bumper extension fitted over the radar module extends from the existing bumper. Radio waves emitted from and received by the radar module must be able to readily pass through the bumper extension without being altered. To be suitable for covering the radar module the bumper extension must be of a uniform thickness, fairly flat and non-metallic with no metal or chrome to interfere with its beam patch.

20 Claims, 5 Drawing Sheets

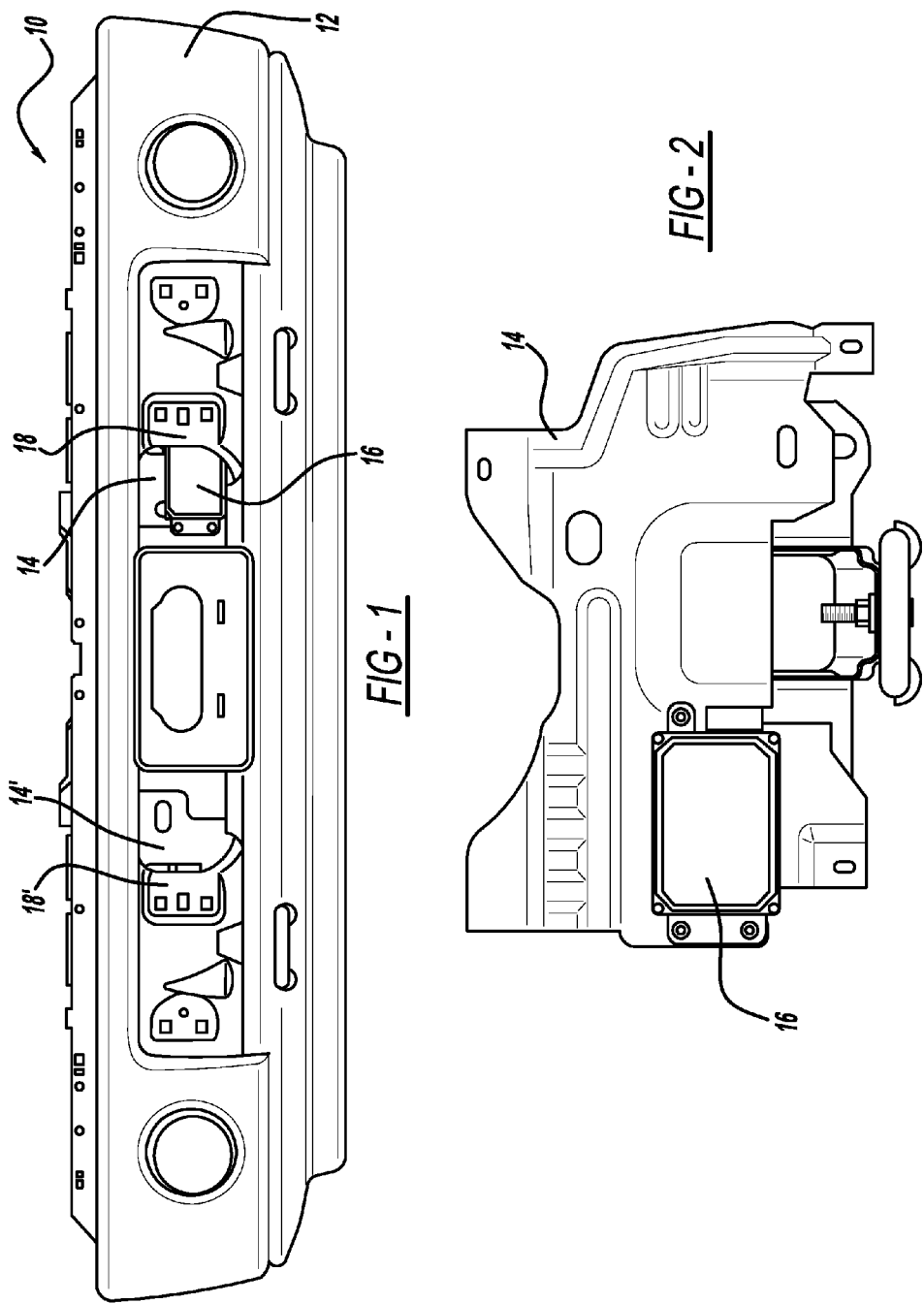

BUMPER INTEGRATED FORWARD RADAR MOUNTING SYSTEM

TECHNICAL FIELD

The disclosed invention relates generally to radar systems for automotive vehicles. More particularly, the disclosed invention relates to a bumper integrated forward radar mounting system integrated into the front portion of the front bumper of the vehicle. The radar is attached to a bumper attachment bracket. An extension of the bumper in the form of a cover is provided over the opening to cover the radar module.

BACKGROUND OF THE INVENTION

Many modern vehicles are fitted with radar systems for detecting objects and their positions relative to the vehicle. The most common of these is a rearward radar system. However, forward radar systems are becoming increasingly available on vehicles. These forward radar systems are multifunctional and are able to provide adaptive cruise control and pre-crash braking features as well as other customer features.

Packaging the radar in the front of the car creates a number of difficulties for the designer. Such packaging is a challenging mixture of often conflicting requirements for cooling, styling and radar performance as well as other requirements. Manufacturers attempt to employ a common package strategy across all cars in a vehicle lineup in an effort to achieve the advantages of reduced cost and complexity while maintaining quality.

In known arrangements for forward systems, the radars are typically packaged either above or below the front bumper. When positioned above the front bumper the radar provides for better performance but presents styling challenges in that the area above the bumper is ordinarily highly styled. Specifically, upper bumper extensions and grilles ordinarily have complex styling that often includes extensive chrome finishing and other materials not conducive with radar.

Alternatively, placement of the radar below the front bumper is easier to implement with styling considerations but does not provide the best performance. In addition, the area below the bumper is often the source of most of the vehicle's cooling air.

Accordingly, as in so many areas of vehicle technology, there is room in the art of forward radar systems for vehicles for an alternative configuration that provides good performance without sacrificing styling and without adding burdensome manufacturing and assembly costs.

SUMMARY OF THE INVENTION

The disclosed invention provides a bumper integrated forward radar mounting system for use with a vehicle. The system includes a radar module, a bumper attachment bracket and a bumper extension. The radar module is attached to the bumper attachment bracket. The bumper extension is fitted over the radar module.

The bumper attachment bracket may be composed of a metal such as steel or a polymerized material selected from any one of several plastics, fiberglass or nylon, which may or may not be carbon reinforced.

The bumper extension fitted over the radar module extends from the existing bumper. Radio waves emitted from and received by the radar module must be able to readily pass through the bumper extension without being altered. Accordingly the bumper extension is made from a material other than a metal, such as any one of several plastics, fiberglass or nylon, which may or may not be carbon reinforced. To be suitable for covering the radar module the bumper extension must be of a uniform thickness, fairly flat and non-metallic with no metal or chrome to interfere with its beam patch. This provides a good match for the bumper covering material.

The radar module may comprise one or both of a medium range radar component and a long range radar component. Regardless of the number, the radar module is attached to the bumper attachment bracket by any one of several means including but not limited to mechanical fasteners such as press-fitted studs.

The bumper extension may be flush with the adjacent bumper surface or may be otherwise shaped so as to form a part of the overall design configuration.

The disclosed invention provides many advantages over known systems. The bumper itself typically has no chrome to interfere with a bumper-mounted radar system. Thus the system may be easily incorporated into a vehicle design. This solution provides a consistent approach to mounting the forward radar with little or no impact on styling of the vehicle and little or no impact on cooling airflow. Also the cost of a separate mounting bracket insert for the radar will be eliminated or substantial reduced. The system of the disclosed invention also can be used by a manufacturer across all vehicle lines without significant variation, thus reducing design costs and eliminating the need for the manufacturer to design each vehicle from scratch.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 illustrates a front perspective view of a vehicle front bumper assembly according to the disclosed invention;

FIG. 2 illustrates a front view of the radar module attached to the bumper attachment bracket according to the disclosed invention;

DETAILED DESCRIPTION OF THE PREFERRED EMBODIMENT

Figure 3:
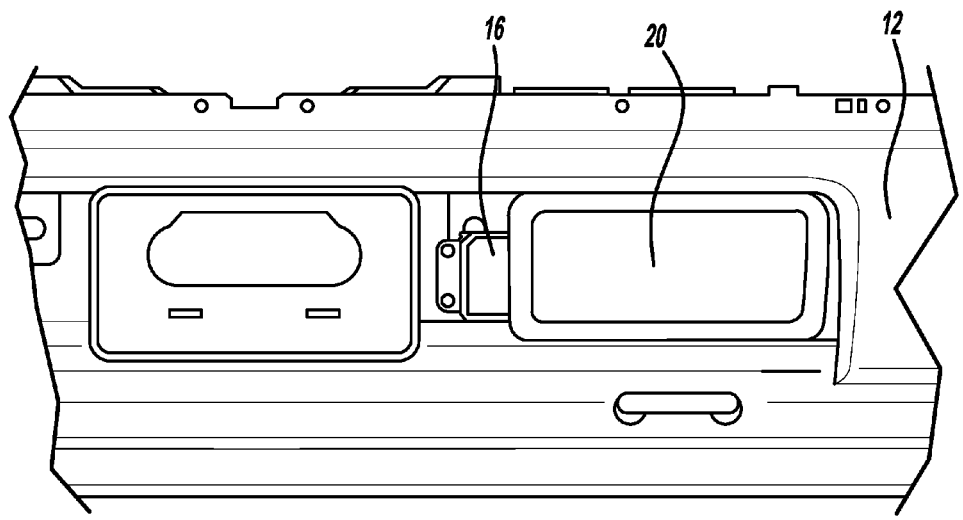
FIG. 3 illustrates a close up view of a portion of the vehicle front bumper assembly of FIG. 1 but illustrating a bumper extension fitted over a radar module according to the disclosed invention.

In the following figures, the same reference numerals will be used to refer to the same components. In the following description, various operating parameters and components are described for different constructed embodiments. These specific parameters and components are included as suggested examples and are not meant to be limiting.

Referring to FIG. 1, a front perspective view of a vehicle front bumper assembly, generally illustrated as 10, is shown. The front bumper assembly 10 includes a bumper 12. It is to be understood that the illustrated shape and configuration of the bumper 12 is shown here for illustrative purposes only and is not intended as being limiting as the disclosed invention may be readily adapted for use with bumpers having other shapes and configurations.

The bumper 12 is attached to the vehicle (not shown) by bumper attachment brackets 14 and 14'. A portion of the bumper attachment bracket 14 is shown more clearly in FIG. 2. The bumper attachment bracket 14 may be formed from one of any of several durable and resilient materials such as high strength steel or from a polymerized material selected from any one of several plastics, fiberglass or nylon, which may or may not be carbon reinforced. As is the case of the bumper itself, the shape and configuration bumper attachment bracket 14 is for illustrative purposes only and is not intended as being limiting as a variety of shapes and configurations may be adapted for use in the disclosed invention.

Strategically disposed on the bumper attachment bracket 14 is a radar module 16. An important aspect of the disclosed invention is its adaptability as the radar module 16 may be utilized with either a purpose-designed bumper or with a conventional bumper. In the event that a conventional bumper is used some slight modification may be needed. Particularly, and with reference to FIG. 1, the bumper 12 (if "off the shelf") may require slight modification such as the removal of one or more portions 18 and 18' to accommodate the radar module 16.

As illustrated in FIG. 1, the radar module 16 is fitted close to the ideal location for effective radar operation. Particularly, according to the disclosed invention, the radar module 16 is fitted high and toward the center of the bumper attachment bracket 14. It is to be understood that the shape and placement of the radar module 16 are only to be taken as suggestive and non-limiting.

The radar module 16 preferably consists of one or both of a medium range component beam and a long range radar component. Both of these components may be integrated into a single radar module 16. Insofar as the typical set-up would have two radar modules mounted in association with the bumper 12 it may be that one radar module includes only a medium range component while the other radar module includes a long range component.

Figure 4:
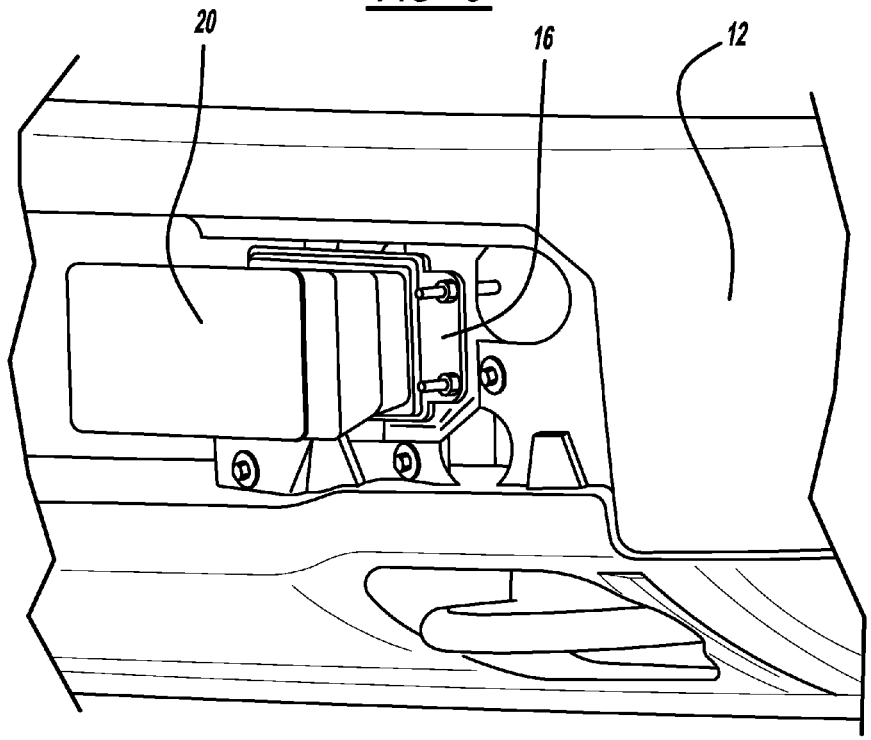
FIG. 4 illustrates a perspective view of the portion shown in FIG. 3.

Regardless of the number or placement of the radar module 16, it is desirable to provide protection to the radar module 16. As illustrated in FIGS. 3 and 4, a bumper extension 20 is fitted partially or entirely over the radar module 16. The bumper extension 20 is preferably composed of a polymerized material of a variety of possible types and thus acts as a radome through which radar signals may easily pass. The bumper extension 20 also serves to protect the underlying radar module from protection from water, ice and road debris. The shape, placement and configuration of the bumper extension 20 may be varied from that shown without deviating from the spirit of the invention.

Figure 5:
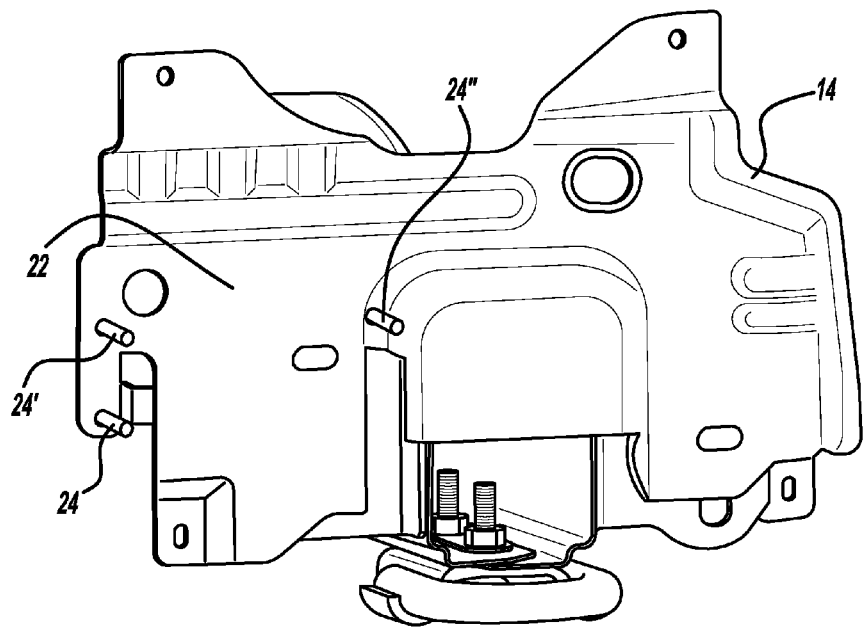
FIG. 5 is a front view showing part of the bumper attachment bracket shown without the radar module to illustrate the attachment structures.
Figure 6:
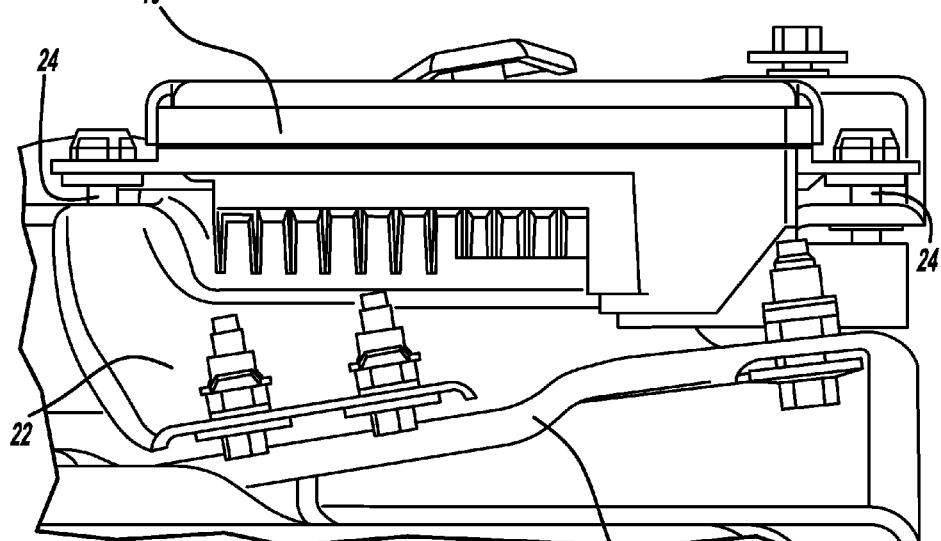
FIG. 6 is an underside view of a portion of the vehicle front bumper assembly of FIG. 1 illustrating the radar module attached to the bumper attachment bracket.

Attachment of the radar module 16 to the bumper attachment bracket 14 may be made by any one of several methods of attachment. This is best illustrated in FIGS. 5 and 6. FIG. 5 illustrates a front view of the portion of the bumper attachment bracket 14 shown in FIG. 2 without the radar module 16. FIG. 6 illustrates an underside view of a portion of the vehicle front bumper assembly of FIG. 1 illustrating the radar module 16 attached to the bumper attachment bracket 14.

With respect to FIG. 5, the bumper attachment bracket 14 includes a radar module-receiving area 22 defined therein for disposition of the radar module 16 (not shown). The footprint defined by the radar module-receiving area 22 is adapted for proper nesting of the radar module 16.

The radar module 16 is attached to the radar module-receiving area 22 by mechanical fasteners, such as press-fitted studs 24, 24', and 24" of which studs 24, 24' and 24" are illustrated in FIG. 5 and studs 24 and 24" are illustrated in FIG. 6. One or more of the studs 24, 24' and 24" may function as adjustment screws. A greater or lesser number of studs may be fitted. In addition, other methods of mechanical fastening may be used other than the illustrated press-fitted studs.

Not shown but understood is the presence of one or more additional holes in the bumper attachment bracket 14 for electrical power connection between the vehicle and the radar module 18.

To assure proper operation of the system of the disclosed invention, correct installation and alignment are important. Proper installation and alignment of the radar module in the vehicle are important to assure that the module is aligned parallel with the ground to within a defined tolerance.

According to known installation methods for forward-positioned radar modules, a large precision bracket having a long, rearward-extending alignment arm is used to assure that the radar is aligned with the bracket. According to this arrangement the assembly plant only needs to install the radar module and tighten the fasteners according to a prescribed sequence and the module self-aligns by design. In this process the supplier of the radar module pre-aligns the module to each individual support bracket to account for variation in the radar modules and support brackets. Once attached, the pre-aligned assembly is sent to the vehicle plant.

The known method, while being satisfactory according to the prior art, is not satisfactory for installation and alignment of the radar module 16 of the front bumper assembly 10 of the disclosed invention. Instead, a new method is needed to support the bumper-integration because a long rear-ward alignment arm previously used is not feasible for use in the disclosed invention. Also it is desired to utilize a bumper attachment bracket 14 that is low cost relative to current designs to which the radar module 16 may be readily attached using the integrated mounting studs 24, 24' and 24" described above.

The disclosed method also removes the supplier from pre-alignment process, thus lowering process steps and improving accuracy. In addition, it is desired to include a process in which each radar module 16 is fitted to the bumper attachment bracket 14 on a case-by-case basis that produces a fit unique to each vehicle rather than the current "one size fits all" approach. This is important particularly for trucks which offer a great variety of body styles, drive trains and option packages and thus vary significantly from unit to unit for ride height and pitch.

Figure 7:
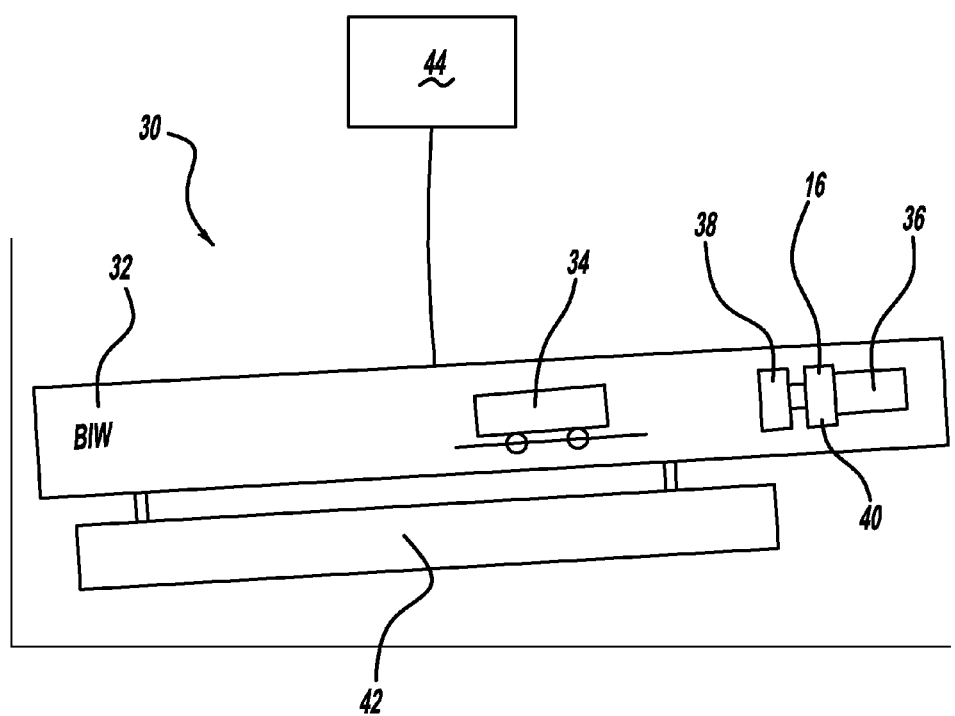
FIG. 7 is a graphical illustration of a system for aligning the radar module of the disclosed invention.

The system for in-plant alignment of the radar module 16 on the vehicle is shown in FIG. 7. The system, generally illustrated as 30, is operated in conjunction with a body-in-white vehicle (BIW) 32 to which at least one radar module 16 has been attached as set forth above. The system 30 includes a first inclinometer 34 and a second inclinometer 36. The second inclinometer 36 includes a low tolerance bracket 38 having a vertical adjuster (to compensate for uncontrolled vertical bracket variances) and a nut runner 40. The system 30 is associated with a skillet and posts array 42 to compensate for wear and error. A computer 44 is provided to which components of the system 30 are operatively attached.

Figure 8:
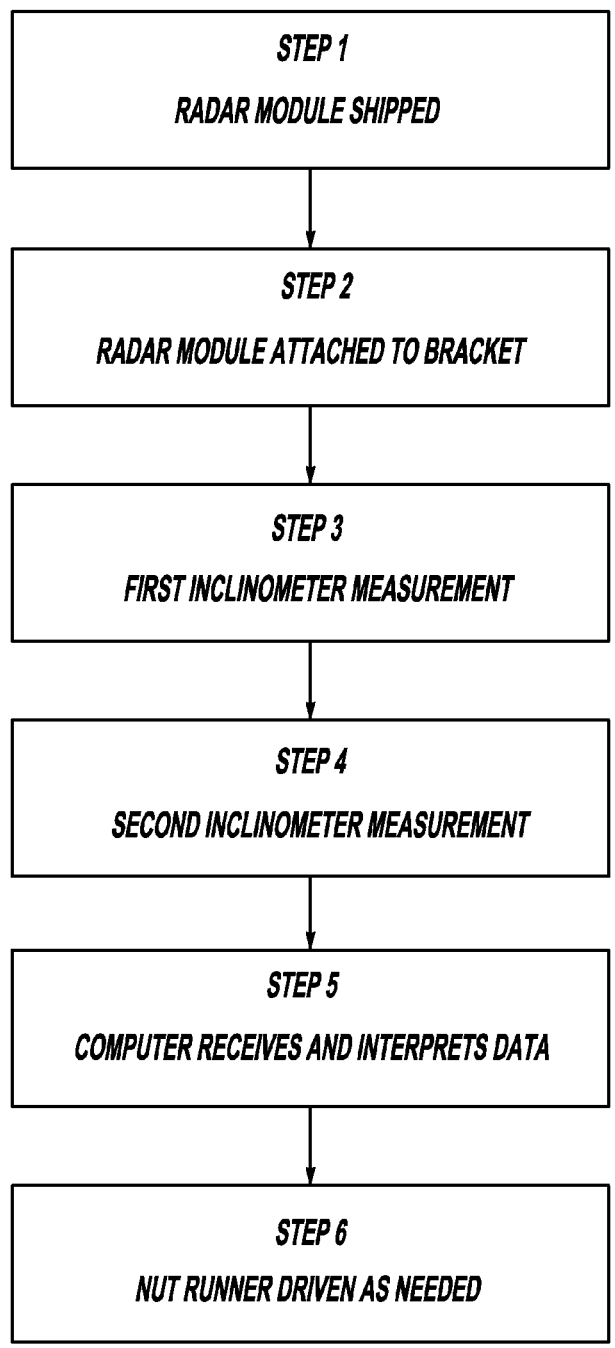
FIG. 8 is a flow chart illustrating the steps for using the system of FIG. 7 for aligning the radar module according to the disclosed invention.

The step-by-step operation of the system 30 is illustrated in FIG. 8. At step 1, the individual radar module 16 is shipped to the vehicle plant alone, that is, without the bumper attachment bracket 14. At step 2, the radar module 16 is attached to the bumper attachment bracket 14. The first electronic inclinometer 34 measures the alignment of the radar module 16 with respect to gravity at step 3.

Once the alignment of the radar module 16 with respect to gravity is confirmed at step 3, the second inclinometer 36 measures the vehicle body with respect to gravity to account for variation from vehicle to vehicle at step 4. The low tolerance bracket 38 compensates for uncontrolled vertical bracket variances. The internal parameters for each radar module 16 are provided on a bar code of the individual radar module 16 which are read by the second inclinometer 36.

At step 5, a computer controlling the entire alignment process receives the barcode on the radar module 16 and the results from the first inclinometer 34 in which inclination=+Z and from the second inclinometer 36 in which +Z−S is determined to offset for skillet measurement and squint of the radar module 16 as well as bracket and mount variation. It is possible to add +Y (required radar angle to adapt to various build combinations) to account for vehicle stance per build information if necessary, which may be the case for trucks.

Based on these findings, at step 6 the computer 44 controls the nut runner 40 which will drive one or more of the studs 24, 24' and 24" until the radar module 16 is at the desired set point.

The disclosed invention provides an effective and practical arrangement for a bumper integrated forward radar mounting system. The system may be incorporated into a bumper design without detracting from styling and structural integrity and with no impact on cooling airflow. On assembly, the radar module can be manually adjusted prior to installation of the bumper extension cover. The system of the disclosed invention also helps to reduce assembly and installation cost by eliminating the need for a separate mounting bracket insert for the radar module. In addition, the system of the disclosed invention also can be used by a manufacturer across all vehicle lines without significant variation, thus reducing design costs and eliminating the need for the manufacturer to design each vehicle from scratch.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A bumper integrated radar mounting system for use in a vehicle comprising:
    a bumper;
    a bumper attachment bracket attached to the vehicle, said bumper being attached to said bracket, said bracket having a front side and a radar module-receiving area defined thereon;
    a radar module substantially attached to said radar module-receiving area; and
    a bumper extension at least partially fitted over said radar module.

2. The bumper integrated radar mounting system of claim 1 wherein said radar module comprises a medium range radar component and a long range radar component.

3. The bumper integrated radar mounting system of claim 1 wherein said bumper extension is formed from a polymerized material.

4. The bumper integrated radar mounting system of claim 1 wherein said front side of said bumper attachment bracket has a surface and wherein said bumper extension is flush with said surface.

5. The bumper integrated radar mounting system of claim 1 further including press fitted studs attached to said radar module-receiving area for attachment of said radar module thereto.

6. The bumper integrated radar mounting system of claim 5 wherein at least one of said studs functions as an adjustment screw.

7. A bumper integrated radar mounting system for use in a vehicle comprising:
    a bumper attachment bracket attached to the vehicle, said bracket having a radar-module-receiving area defined thereon;
    a radar module substantially fitted within said radar module-receiving area; and
    a bumper extension fitted over said radar module.

8. The bumper integrated radar mounting system of claim 7 further including a bumper, said bumper being attached to said bumper attachment bracket.

9. The bumper integrated radar mounting system of claim 7 wherein said radar module comprises a medium range radar component and a long range radar component.

10. The bumper integrated radar mounting system of claim 7 wherein said bumper extension is formed from a polymerized material.

11. The bumper integrated radar mounting system of claim 8 wherein said bumper has a front side and wherein said front side has a surface and wherein said bumper extension is flush with said surface.

12. The bumper integrated radar mounting system of claim 8 further including press fitted studs attached to said radar module-receiving area for attachment of said radar module thereto.

13. The bumper integrated radar mounting system of claim 12 wherein at least one of said studs functions as an adjustment screw.

14. A bumper integrated radar mounting system for use in a vehicle comprising:
    a bumper radar assembly having a front side, said bumper radar assembly including a radar module-receiving area formed in said front side; and
    a radar module substantially fitted within said radar module-receiving area.

15. The bumper integrated radar mounting system of claim 14 further including a bumper extension fitted over said radar module.

16. The bumper integrated radar mounting system of claim 14 wherein said bumper radar assembly includes a bumper having a back side and a bumper attachment bracket to which said back side is attached, said radar module-receiving area being formed in said bumper attachment bracket.

17. The bumper integrated radar mounting system of claim 14 wherein said radar module comprises a medium range radar component and a long range radar component.

18. The bumper integrated radar mounting system of claim 15 wherein said bumper extension is formed from a polymerized material.

19. The bumper integrated radar mounting system of claim 15 wherein said front side of said bumper radar assembly has a surface and wherein said bumper extension is flush with said surface.

20. The bumper integrated radar mounting system of claim 14 further including press fitted studs attached to said radar module-receiving area for attachment of said radar module thereto.

* * * * *